(12) United States Patent
Brey et al.

(10) Patent No.: US 7,499,970 B2
(45) Date of Patent: Mar. 3, 2009

(54) METHOD AND SYSTEM FOR SUPERVISOR PARTITIONING OF CLIENT RESOURCES

(75) Inventors: Thomas M. Brey, Cary, NC (US); Giles R. Frazier, Austin, TX (US); Gregory F. Pfister, Austin, TX (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/986,577

(22) Filed: Nov. 12, 2004

(65) Prior Publication Data

US 2006/0106927 A1 May 18, 2006

(51) Int. Cl.
*G06F 15/13* (2006.01)

(52) U.S. Cl. .................. 709/203; 709/209; 709/210; 709/211; 705/67; 705/71; 705/72; 711/163; 711/164

(58) Field of Classification Search .................. 709/203, 709/209, 210, 211; 705/67, 71, 72; 711/163, 711/164
See application file for complete search history.

(56) References Cited

U.S. PATENT DOCUMENTS

| | | | |
|---|---|---|---|
| 5,557,678 A * | 9/1996 | Ganesan | 380/282 |
| 5,845,082 A | 12/1998 | Murakami | 395/200.56 |
| 6,101,508 A | 8/2000 | Wolff | 707/218 |
| 6,185,601 B1 | 2/2001 | Wolff | 709/203 |
| 6,470,022 B1 | 10/2002 | Rochberger | 370/437 |
| 6,650,620 B1 | 11/2003 | Neogi | 370/231 |
| 6,766,353 B1 * | 7/2004 | Lin et al. | 709/203 |
| 6,813,501 B2 * | 11/2004 | Kinnunen et al. | 455/456.2 |
| 6,842,523 B1 * | 1/2005 | Niwa et al. | 380/286 |
| 2003/0084140 A1 | 5/2003 | Takeuchi et al. | 709/223 |
| 2003/0126200 A1 | 7/2003 | Wolff | 709/203 |
| 2006/0002385 A1 * | 1/2006 | Johnsen et al. | 370/389 |

OTHER PUBLICATIONS

U.S. Appl. No. 10/702,179 filed Nov. 5, 2003 re: T. Brey et al.

* cited by examiner

*Primary Examiner*—Jinsong Hu
(74) *Attorney, Agent, or Firm*—Cantor Colburn LLP; Geraldine Monteleone

(57) ABSTRACT

A method for supervisor partitioning of client resources in a communications environment includes receiving, at a client node, an allocated set of resources over a communications network, and partitioning the allocated set of resources among one or more applications associated with the client node using a local authority. Following the partitioning, communication requests are issued from the one or more applications to a shared resource provider node without inspection by the local authority.

5 Claims, 5 Drawing Sheets

METHOD AND SYSTEM FOR SUPERVISOR PARTITIONING OF CLIENT RESOURCES

BACKGROUND

The present invention relates generally to managing resources within a communications environment, and, more particularly, to a method and system for supervisor partitioning of resources across a communications medium.

In one embodiment, a communications environment includes a plurality of client nodes coupled to one or more nodes via a communications medium. One example of such as communications medium is the InfiniBand™ medium, which is described in further detail in "InfiniBand Architecture Specification Volume 1," Release 1.2, October, 2004, available from the InfiniBand Trade Association at 5440 SW Westgate Drive, Suite 217, Portland, Oreg., 97221, or online at www.Infinibandta.org, which is hereby incorporated herein by reference in its entirety. InfiniBand is a trademark of the InfiniBand Trade Association.

The InfiniBand transport enables a set of interconnected nodes, referred to as a subnet, to communicate with one another. It also provides a partitioning scheme that allows a subnet to be logically subdivided into sets of nodes, referred to as partitions. A partition includes one or more nodes, acting as either clients or server nodes. A node, such as a server node, can be included in more than one partition. The members of a partition communicate with one another, but are unable to access partitions in which they are not members.

Within an InfiniBand™ (IB) fabric, resource-provider nodes that may be shared by various client nodes are partitioned by a Subnet Manager such that each client node is allowed to reach and therefore use all the resources at the shared node. Thus, when a node (e.g., a server node) is included in multiple partitions, all of the resources of that node are accessible by all of the partitions that include that node. When a resource provider node receives a request from a client node, it provides access to all of the resources that the client node is allowed to use regardless of the application within the client node from which the request came. However, this accessibility is not adequate in many cases from either a security or performance standpoint when there is a need to restrict the resources that each application can access as a subset of all resources allocated to the node. Thus, a need exists for a capability that restricts the resources that each application on a given client node is allowed to use. More particularly, a need exists for such a capability in which the resource allocations of a client node may be dynamically changed by the hypervisor or supervisor. Providing the hypervisor or supervisor with this capability will enable resource balancing to occur at system speeds without the need for human interaction, such that system operations may continue uninterrupted.

SUMMARY

The foregoing discussed drawbacks and deficiencies of the prior art are overcome or alleviated by a method for supervisor partitioning of client resources in a communications environment. In an exemplary embodiment, the method includes receiving, at a client node, an allocated set of resources over a communications network, and partitioning the allocated set of resources among one or more applications associated with the client node using a local authority. Following the partitioning, communication requests are issued from the one or more applications to a shared provider node without inspection by the local authority.

In another embodiment, a method for supervisor partitioning of client resources in a communications environment includes receiving, at each of a plurality of client nodes, an allocated set of resources determined by a central authority. At each of the plurality of client nodes, the allocated set of resources is partitioned among one or more applications associated with each of the plurality of client nodes using a local supervisor associated therewith. Following the partitioning, communication packets are issued from the one or more applications to a resource provider node without inspection by the corresponding supervisor.

In still another embodiment, a system for supervisor partitioning of client resources in a communications environment includes a plurality of client nodes, each receiving an allocated set of resources determined by a central authority. At each of the plurality of client nodes, the allocated set of resources is partitioned among one or more applications associated with each of the plurality of client nodes using a local supervisor associated therewith. Following the partitioning, communication packets are issued from the one or more applications to a resource provider node without inspection by the corresponding supervisor.

In still another embodiment, a storage medium includes a machine readable computer program code for supervisor partitioning of client resources in a communications environment, and instructions for causing a computer to implement a method. The method includes receiving, at each of a plurality of client nodes, an allocated set of resources determined by a central authority. At each of the plurality of client nodes, the allocated set of resources is partitioned among one or more applications associated with each of the plurality of client nodes using a local supervisor associated therewith. Following the partitioning, communication packets are issued from the one or more applications to a resource provider node without inspection by the corresponding supervisor.

BRIEF DESCRIPTION OF THE DRAWINGS

Referring to the exemplary drawings wherein like elements are numbered alike in the several Figures.

DETAILED DESCRIPTION

Disclosed herein is a method and system for supervisor partitioning of client resources in a communications environment. Briefly stated, a supervisor (or hypervisor) within a client node may configure a resource provider node such that the resource provider node will restrict the resources that each application on the client node is allowed to use. Because it is the supervisor program that actually changes the resource allocations of its client applications dynamically (and thus obviating the need for human interaction), system operations can continue uninterrupted.

A mechanism is defined herein that allows a supervisor (or a hypervisor) within the client node to control the resources on a resource-provider node that each of its client applications is allowed to use. In this manner, the supervisor can dynamically subdivide the resource provider node's resources and allocate a subset of those resources to each of its client applications. This in turn enables the supervisor to manage the I/O, computing demands and resource authorizations of each of its client applications in an enforceable and more efficient manner than was previously possible, and further shifts the burden of assigning client resources from the system administrator to the supervisor (or hypervisor).

In order to enable a supervisor (or hypervisor) to limit the resources that each of its client applications can use, a "resource key" is defined. In an exemplary embodiment, such resource keys are sequences of digits that can be arbitrarily long, thereby being unguessable. Supervisors are able to associate each resource key with a subset of the available resources within a resource-provider node, and also to provide that resource key(s) to each of their client applications. The manner in which this is carried out enables the supervisor to enforceably manage the resources accessed by each of its clients. Although the supervisor can allocate subsets of the resources available to the node among each of its client applications, the resource-provider does not allow a supervisor to allocate more resources than were originally assigned to the supervisor's node by a network administrator device manager during configuration.

After the supervisor creates the associations between client applications, resource keys, and resources at a resource-provider node, the supervisor passes the resource key to the client application. Having done this, the supervisor does not then need to subsequently inspect each request packet issued by its client applications to resource provider nodes in order to ensure that the application is only accessing authorized resources. This inspection is unnecessary since the resource-provider nodes are directly able to determine the allowed resources, based on the resource key contained in the request packet from the client application.

Figure 1:
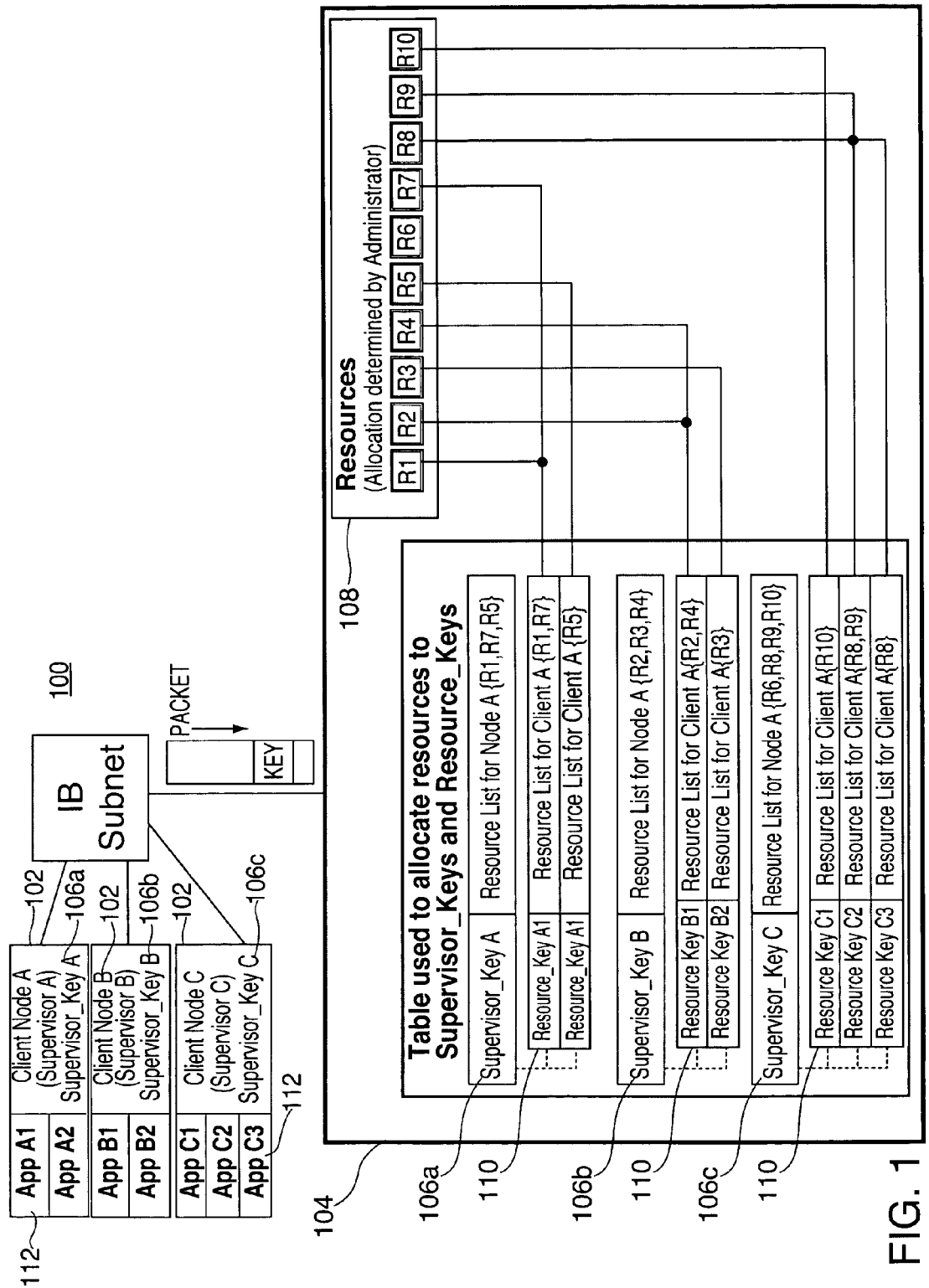
FIG. 1 is a schematic block diagram of an exemplary communications environment (e.g., IB subnet) suitable for use in accordance with an embodiment of the invention.

Referring now to FIG. 1, there is shown a schematic block diagram of an exemplary communications environment 100 (e.g., subnet) suitable for use in accordance with an embodiment of the invention. In the example of FIG. 1, three client nodes 102 are illustrated: Client Node A, Client Node B, and Client Node C. Each client node 102 in turn includes a supervisor (i.e., a local authority), designated as Supervisor A, Supervisor B, and Supervisor C, respectively. A resource-provider node 104 (e.g., an InfiniBand "IB" I/O unit, or IOU) is shared among the three client nodes 102 in the subnet (i.e., Client Node A, Client Node B, and Client Node C). Furthermore, each of the client nodes A, B, and C has a corresponding supervisor key 106a, 106b, 106c, designated as Supervisor Key A, Supervisor Key B, and Supervisor Key C, respectively.

During initialization, a manager node (i.e., a centralized authority) such as an IB Device Manager (not shown FIG. 1) associates a subset of the resources 108 of the resource-provider node 104 with each supervisor key. In the exemplary embodiment depicted, the individual resources 108 are designated R1 through 10. As is further shown in FIG. 1, resources R1, R5, and R7 are associated with Supervisor Key A. Resources R2, R3, and R4 are associated with Supervisor Key B, while resources R6, R8, R9, and R10 are associated with Supervisor Key C. In accordance with an embodiment of the invention, during initialization, a plurality of resource keys 110 are associated with each supervisor key 106, wherein a specific resource key corresponds to an application 112 of a given client node.

For example, Resource Keys A1 and A2 are associated with Supervisor Key A, Resource Keys B1 and B2 are associated with Supervisor Key B, and Resource Keys C1, C2 and C3 are associated with Supervisor Key C. During an initialization process, specific application resources are generally not associated with resource keys during initialization. Rather, this association between a resource key and a specific application is implemented after initialization by the respective supervisors of each client node, as explained hereinafter.

Figure 2:
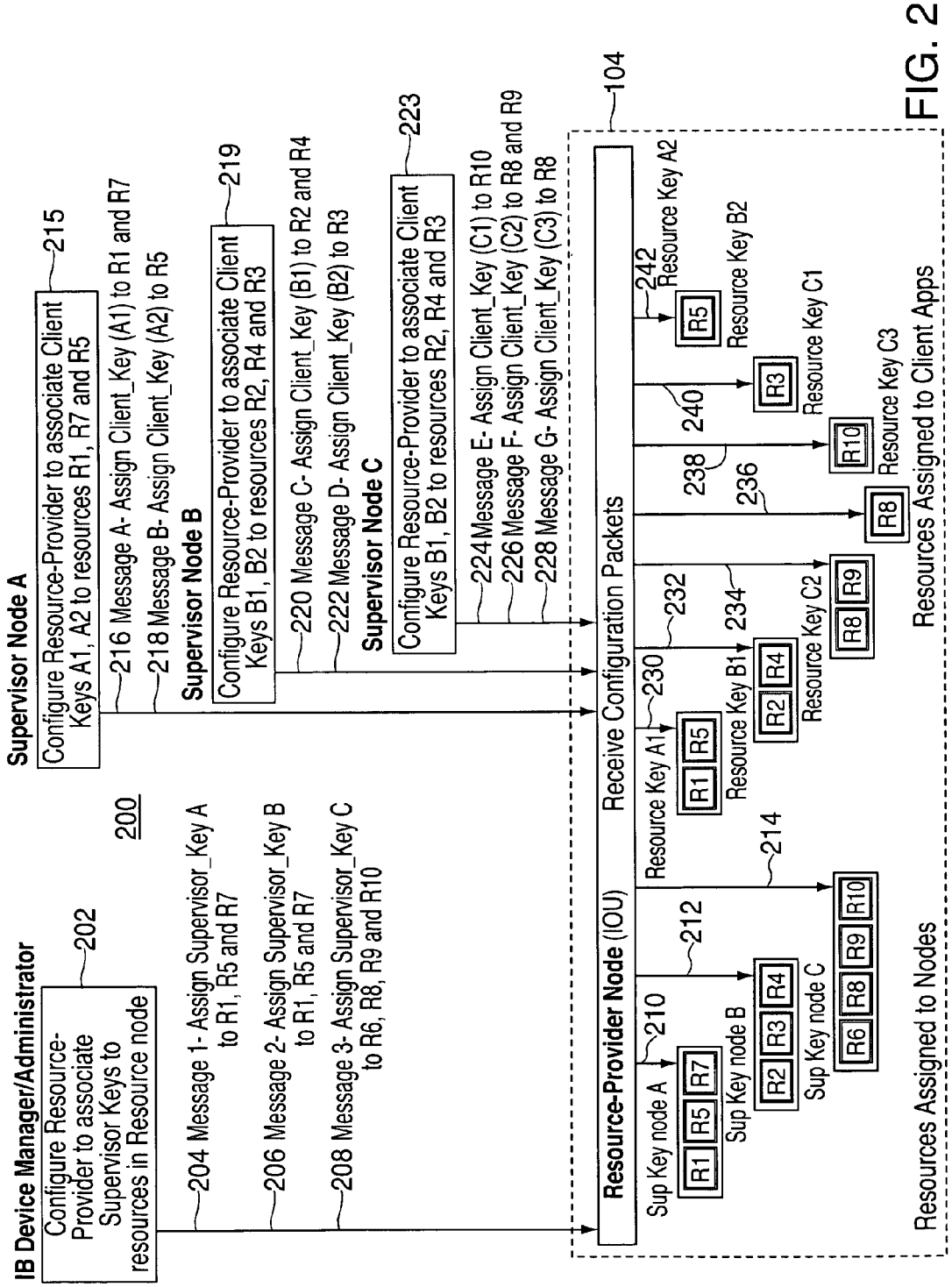
FIG. 2 is a schematic block diagram of a configuration sequence for the supervisor partitioning of the exemplary communications environment of FIG. 1.

Referring now to FIG. 2, there is shown a schematic block diagram of configuration sequence 200 for the exemplary communications environment 100 of FIG. 1. As is shown, an IB device manager/network administrator 202 communicates a sequence of three (for example) messages 204, 206, 208 to the resource-provider node 104. The first message 204 informs the resource-provider node 104 to assign resources R1, R5 and R7 to Supervisor Key A and assigns the number and value of each resource key 110. The second message 206 informs the resource-provider node 104 to assign resources R2, R3 and R4 to Supervisor Key B and assigns the number and value of each resource key 110, and the third message 208 informs the resource-provider node 104 to assign resources R6, R8, R9 and R10 to Supervisor Key C and assigns the number and value of each resource key 110.

As a result, the resource provider node 104 in turn assigns (210) resources R1, R5 and R7 to Supervisor Key A, assigns (212) resources R2, R3 and R4 to Supervisor Key B, and assigns (214) resources R6, R8 and R9 to Supervisor Key C. Alternatively, the device manager/network administrator 202 could request the resource provider node 104 initiate the key generation process and return the generated keys back to the device manager/network administrator 202.

As indicated previously, however, it is the role of the client node supervisor (or hypervisor) to specifically allocate the assigned node resources to the particular applications associated therewith. Accordingly, FIG. 2 further illustrates a series of communications from each client node supervisor back to the resource-provider node 104 that set forth the assignment of specific resources to specific client applications. In the example depicted, Supervisor Node A sends a configuration packet 215 containing a first message 216 that assigns Resource Key A1 to resources R1 and R7, and a second message 218 that assigns Resource Key A2 to resource R5. Similarly, Supervisor Node B sends a configuration packet 219 containing a first message 220 that assigns Resource Key B1 to resources R2 and R4, and a second message 222 that assigns Resource Key B2 to resource R3. Supervisor Node C sends a configuration packet 223 containing a first message 224 that assigns Resource Key C1 to resource R10, a second message 226 that assigns Resource Key C2 to resources R8 and R9, and a third message 228 that assigns Resource Key C3 to resource R8. Thus, in the example depicted, resource R8 of Client Node C is initially allocated to two applications (C2, C3), while resource R6 is initially unallocated.

In sending the configuration packets to the resource-provider node 104, each client node supervisor includes its corresponding supervisor key, thus identifying the client node. In order to prevent the supervisor of node B or node C from modifying the resources allocated to Supervisor Key A, the resource-provider node 104 only allows a request that contains Supervisor key A to allocate resources to Resource Keys A1 and A2. The same is true for Supervisors B and C. Once a supervisor has associated a subset of the available resources to each of its client applications, a resource key is then passed from the supervisor (or hypervisor) to each of the client applications. As a further result, the resource provider node 104 internally assigns (230) R1 and R7 to Resource Key A1; assigns (232) R2 and R4 to Resource Key B1; assigns (234) R8 and R9 to Resource Key C2; assigns (236) R8 to Resource Key C3; assigns (238) R10 to Resource Key C1; assigns (240) R3 to Resource Key B2; and assigns (242) R5 to Resource Key A2.

Once these initial configuration steps are implemented, the client applications may thereafter make connection requests directly to the resource-provider node 104 without supervisor intervention. To facilitate this, the client application sends a request (such as a connection request, for example) directly to the resource-provider node 104. The request contains the client application's resource key, which was initially provided to the client by its supervisor. Upon receipt of the request, the resource-provider node 104 provides query and access capability only to resources allowed by the resource key in the message.

A significant advantage of the above described methodology is that the request from the client application may be made (after initial connection with the resource provider node) without interaction with the supervisor of the client node. Rather, checking and verification of packets takes place in the resource-provider 104 by means of software or hardware (e.g., standard IB agents) on the resource-provider 104 such as, for example, the communication manager agent or the Device Manager Agent. Because the resource-provider 104 is able to determine whether use of the requested resource is allowed, system performance is not impacted due to supervisor intervention. Furthermore, when the determination of the allowed resources is carried out during connection establishment, there is no need for further verification of any subsequent request packets passed between the two end nodes on a given connection.

Figure 3A:
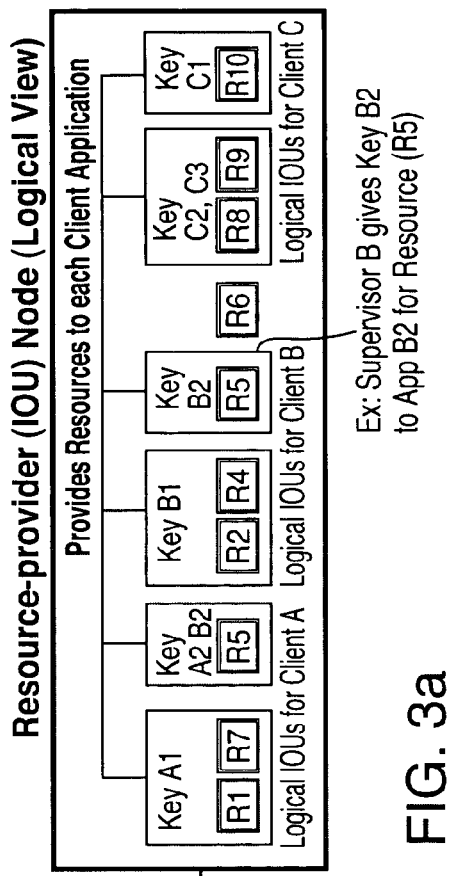
FIGS. 3(a) through 3(c) are schematic block diagrams that illustrate further supervisor partitioning capabilities of the present invention embodiments.
Figure 3A:
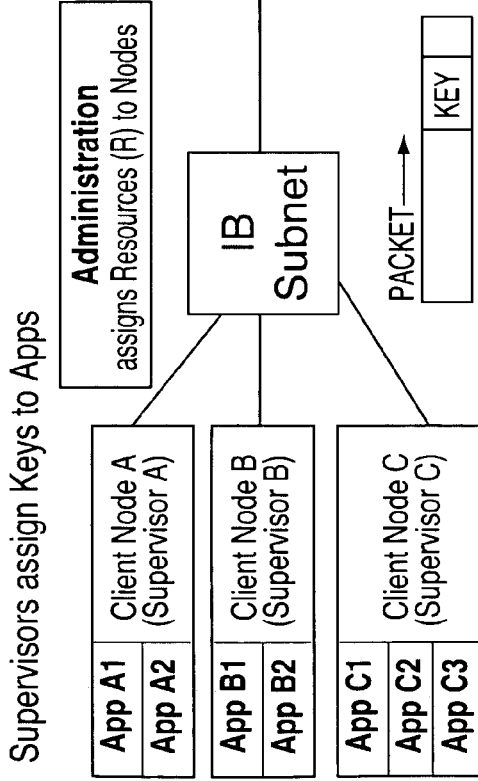
Figure 3B:
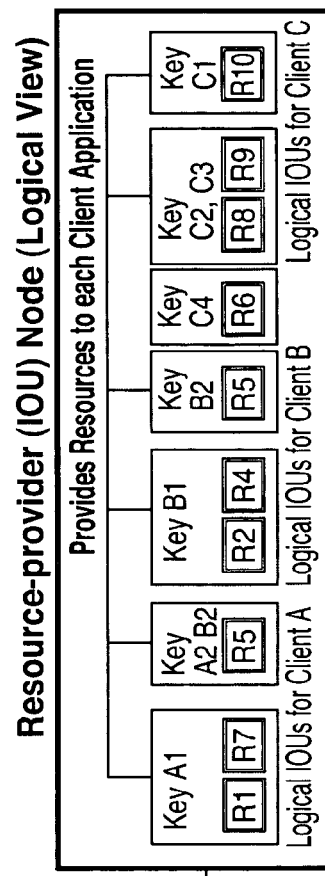
Figure 3B:
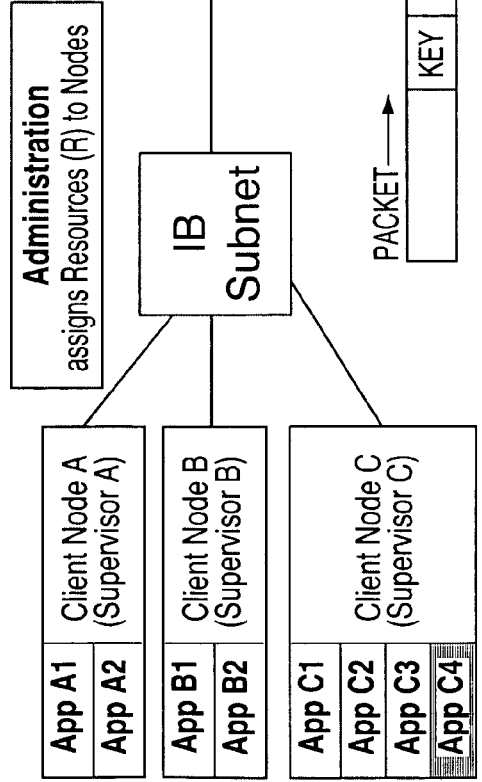
Figure 3C:
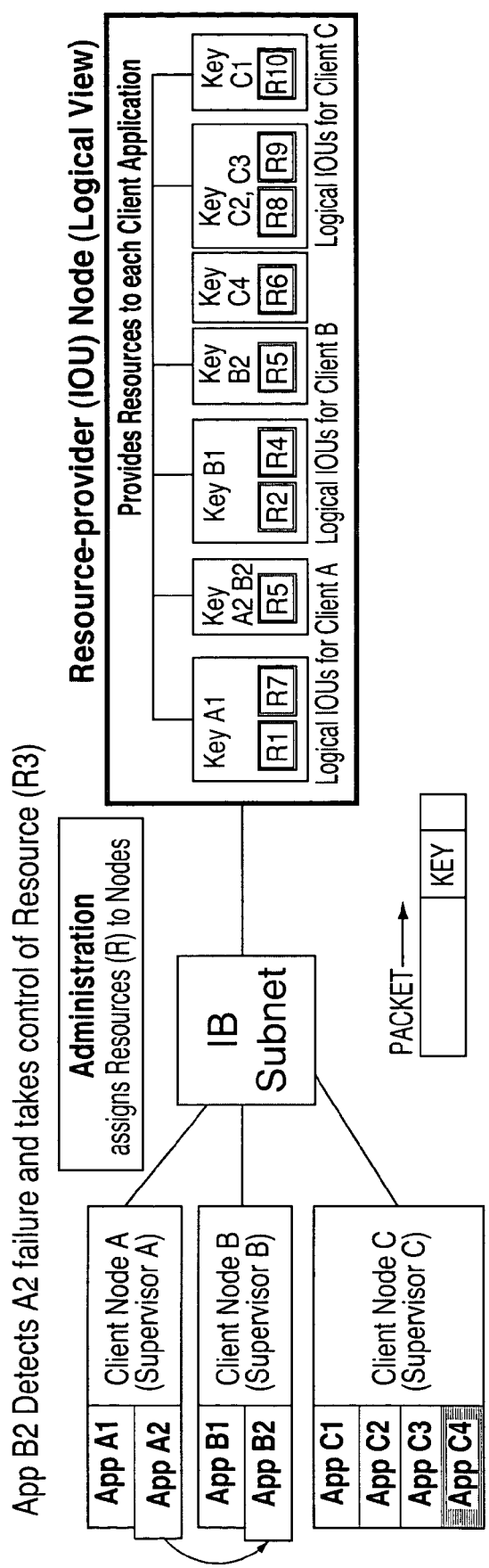

Finally, FIGS. 3(a) through 3(c) are schematic block diagrams that illustrate further supervisor partitioning capabilities of the present invention embodiments. In FIG. 3(a), the administrator has partitioned the resource-provider node for each of the client nodes (Client Node A, Client Node B, Client Node C) as shown before. Resource R6 is assigned to Node C, but is not initially allocated to any of its client applications by Node C. Thus, none of the resource keys C1, C3, C3 of Client Node C are associated with R6. However, as shown in FIG. 3(b), the supervisor of Client Node C engages a new client application C4, and further assigns previously unassigned resource R6 to application C4 without administration assistance. This is permitted, since R6 was initially assigned to Client Node C and since a supervisor may assign, reassign or prevent one or more client applications from accessing any resource assigned to it by the administrator.

FIG. 3(c) demonstrates the capability of supervisors on separate nodes to collaborate in a fault tolerant design using the present methodology. In this configuration, resource R3 is shared by both Client Node A and Client Node B (due to initial allocation of R3 to both client nodes by the administrator). Furthermore, resource R3 is allocated to application A2 by the supervisor of Client Node A, and is also allocated to application B2 by the supervisor of Client Node B. If application B2 is the designated backup or standby for application A2, and either Node A or application A2 fails, then Application B2 has access to resource R3 and can take over at machine speeds without the need for the administrator involvement.

Figure 4:
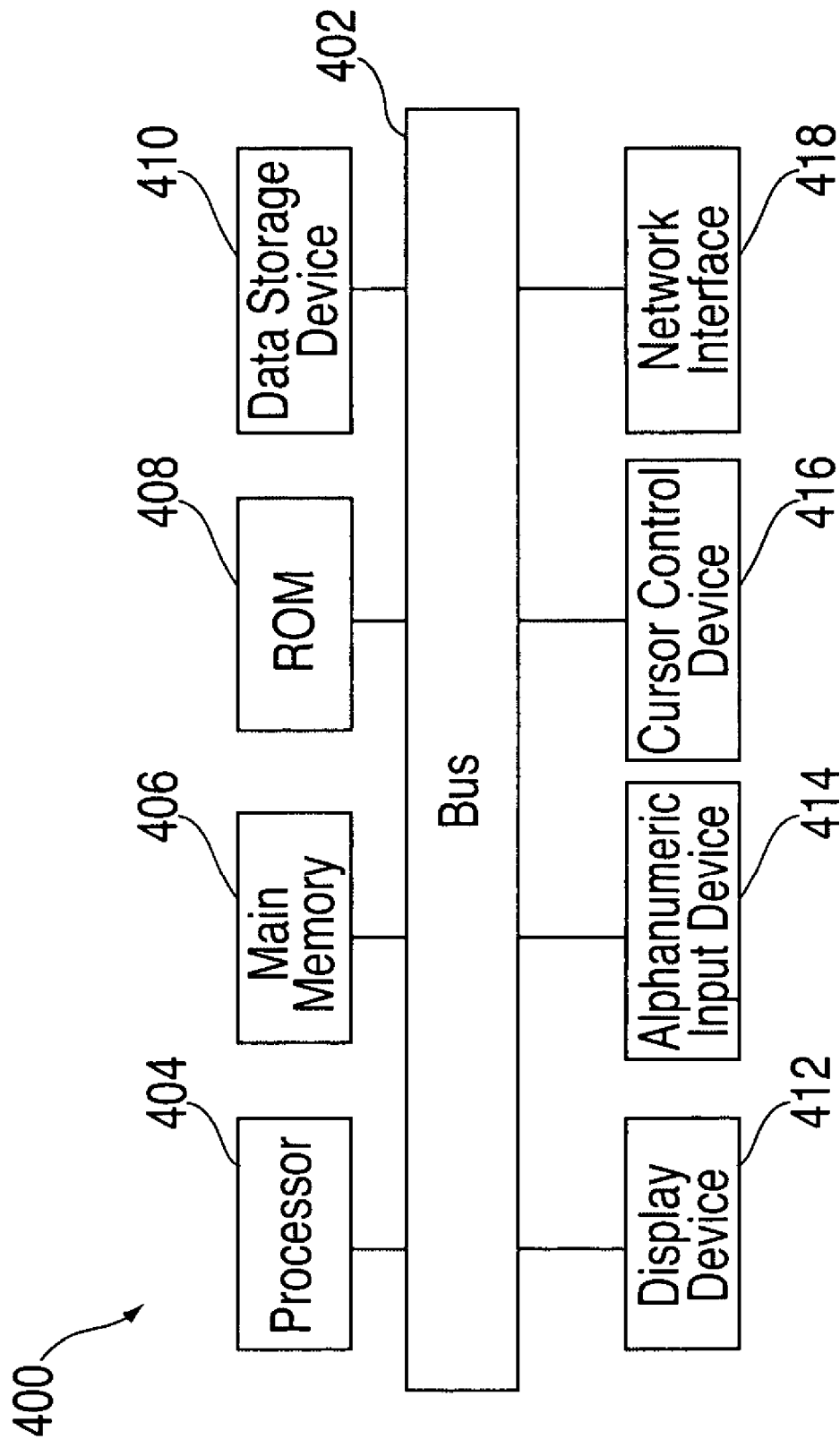
FIG. 4 is an exemplary computing system in which the supervisor partitioning scheme may be implemented.

FIG. 4 is a block diagram of an embodiment of an exemplary computer system 400 in which the above described supervisor partitioning scheme may be implemented. The computer system 400 illustrated in FIG. 4 is intended to represent a broad range of computer systems, and thus alternative computer systems may include more, fewer and/or different components.

As shown in FIG. 4, the computer system 400 includes a bus 402 or other communication device to communicate information, as well as a processor 404 coupled to the bus 402 to process information. Although the computer system 400 is illustrated with a single processor, multiple processors and/or co-processors may also be included.

A random access memory (RAM) or other type of dynamic storage device 406 (depicted as main memory in FIG. 4) is coupled to the bus 402 to store information and instructions to be executed by processor 404. The main memory 406 may also be used to store temporary variables or other intermediate information during execution of instructions by a processor 404. A read only memory (ROM) and/or other static data storage device 408 is also shown coupled to bus 402 for storing static information and other instructions carried out by processor 404, while data storage device 410 (e.g., a magnetic disk or optical disc and corresponding drive) is coupled to bus 402 for storing information and instructions.

The computer system 400 may also be coupled via the bus 402 to a display device 412, such as a cathode ray tube (CRT) or liquid crystal display (LCD), for displaying information to a computer user. An alphanumeric input device 414, including alphanumeric and other keys, may be coupled to the bus 402 to allow a user to communicate information and command selections to the processor 404. Another type of user input device that may be associated with computer system 400 is a cursor control device 416, such as a mouse, a trackball, or cursor direction keys to communicate direction information and command selections to processor 404, as well as to control cursor movement on the display device 412. In addition, a network interface 418 may be used to provide access to a network, such as a local area network.

In view of the above, the present method and system embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for supervisor partitioning of client resources in a subnet communications environment, the method comprising:

receiving, at a client node, an allocated set of resources over a communications network, wherein said allocated set of resources are allocated by a central authority that comprises one of a device manager and a network administrator; and partitioning, using a local authority associated with each said client node, said allocated set of resources among one or more applications associated with said client node, said local authority comprising one of a supervisor or a hypervisor capable of allocating subsets of the resources allocated to the client node among each of its client applications, wherein said central authority assigns resources to a supervisor key associated with said local authority, wherein said partitioning further comprises said local authority associating one or more resource keys with one or more of said allocated resources, and assigning said one or more resource keys to said one or more applications;

wherein, following said partitioning, communication requests are issued from said one or more applications to a shared provider node without inspection by said local authority; and wherein said supervisor key is configured so as to prevent said local authority from partitioning resources not allocated to the client node associated therewith.

2. A method for supervisor partitioning of client resources in a subnet communications environment, the method comprising:

receiving, at a client node, an allocated set of resources over a communications network, wherein said allocated set of resources are allocated by a central authority that comprises one of a device manager and a network administrator; and partitioning, using a local authority associated with each said client node, said allocated set of resources among one or more applications associated with said client node, said local authority comprising one of a supervisor or a hypervisor capable of allocating subsets of the resources allocated to the client node among each of its client applications, wherein said central authority assigns resources to a supervisor key associated with said local authority, wherein said partitioning further comprises said local authority associating one or more resource keys with one or more of said allocated resources, and assigning said one or more resource keys to said one or more applications;

wherein, following said partitioning, communication requests are issued from said one or more applications to a shared provider node without inspection by said local authority; and wherein said resource keys are configured with a bit length so as to prevent guessing thereof.

3. A method for supervisor partitioning of client resources in a subnet communications environment, the method comprising:

receiving, at each of a plurality of client nodes, an allocated set of resources determined by a central authority;

partitioning, at each of said plurality of client nodes, said allocated set of resources among one or more applications associated with each of said plurality of client nodes using a local supervisor associated therewith, said local supervisor capable of allocating subsets of the resources allocated to the client node among each of its client applications, wherein said central authority assigns resources to a supervisor key associated with each supervisor of said plurality of client nodes, and wherein said partitioning further comprises each supervisor associating one or more resource keys with one or more resources allocated to the corresponding client node, and assigning said one or more resource keys to said one or more applications;

wherein, following said partitioning, communication packets are issued from said one or more applications to a resource provider node without inspection by the corresponding supervisor; and wherein said supervisor keys are configured so as to prevent a given supervisor from partitioning resources not allocated to the client node associated therewith.

4. The method of claim 3 wherein said central authority comprises one of a device manager and a network administrator.

5. A method for supervisor partitioning of client resources in a subnet communications environment, the method comprising:

receiving, at each of a plurality of client nodes, an allocated set of resources determined by a central authority;

partitioning, at each of said plurality of client nodes, said allocated set of resources among one or more applications associated with each of said plurality of client nodes using a local supervisor associated therewith, said local supervisor capable of allocating subsets of the resources allocated to the client node among each of its client applications, wherein said central authority assigns resources to a supervisor key associated with each supervisor of said plurality of client nodes, and wherein said partitioning further comprises each supervisor associating one or more resource keys with one or more resources allocated to the corresponding client node, and assigning said one or more resource keys to said one or more applications;

wherein, following said partitioning, communication packets are issued from said one or more applications to a resource provider node without inspection by the corresponding supervisor; and wherein said resource keys are configured with a bit length so as to prevent guessing thereof.

* * * * *